United States Patent
Yamanaka et al.

(10) Patent No.: US 10,643,100 B2
(45) Date of Patent: May 5, 2020

(54) OBJECT DETECTION APPARATUS, OBJECT DETECTION METHOD, AND STORAGE MEDIUM

(71) Applicant: CANON KABUSHIKI KAISHA, Tokyo (JP)

(72) Inventors: Masao Yamanaka, Tokyo (JP); Masakazu Matsugu, Yokohama (JP); Katsuhiko Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 15/583,631

(22) Filed: May 1, 2017

(65) Prior Publication Data

US 2017/0236030 A1 Aug. 17, 2017

Related U.S. Application Data

(63) Continuation of application No. 14/683,025, filed on Apr. 9, 2015, now Pat. No. 9,672,439.

(30) Foreign Application Priority Data

Apr. 15, 2014 (JP) ................................ 2014-083703

(51) Int. Cl.
- *G06K 9/00* (2006.01)
- *G06K 9/46* (2006.01)
- *G06K 9/32* (2006.01)
- *G06K 9/20* (2006.01)

(52) U.S. Cl.
CPC ......... *G06K 9/4671* (2013.01); *G06K 9/2054* (2013.01); *G06K 9/3233* (2013.01); *G06K 9/4609* (2013.01); *G06K 9/4623* (2013.01); *G06K 9/4661* (2013.01)

(58) Field of Classification Search
CPC ........ G06K 9/4671–469; G06K 9/3233–3266; G06K 9/4623
See application file for complete search history.

(56) References Cited

U.S. PATENT DOCUMENTS

| | | | | |
|---|---|---|---|---|
| 8,363,984 B1 * | 1/2013 | Goldman | ............... | G06T 3/0012 |
| | | | | 382/298 |
| 8,478,055 B2 * | 7/2013 | Hosoi | .................. | G06K 9/6278 |
| | | | | 382/118 |
| 9,275,305 B2 * | 3/2016 | Yokono | ............... | G06K 9/00369 |
| 9,330,334 B2 * | 5/2016 | Lin | ....................... | G06K 9/4671 |
| 9,552,622 B2 * | 1/2017 | Chua | ........................ | G06T 3/40 |

(Continued)

*Primary Examiner* — Aaron W Carter
(74) *Attorney, Agent, or Firm* — Canon U.S.A, Inc. IP Division

(57) ABSTRACT

An object detection apparatus first sets a first partial region having a preset size and a second partial region in a given point (pixel) in an input image. In addition, the object detection apparatus calculates a first information amount in the second partial region, and sets a third partial region based on the size of the first information amount. Furthermore, the object detection apparatus calculates a score based on a salience degree that is based on a difference in statistical feature amount distribution between the first partial region and the second partial region, and based on an information amount of feature amount in the third partial region. Lastly, the object detection apparatus detects a main object by calculating scores on the respective points in the image and applying a predetermined statistical process to the scores.

11 Claims, 12 Drawing Sheets

(56) References Cited

U.S. PATENT DOCUMENTS

| | | | |
|---|---|---|---|
| 9,672,612 B2* | 6/2017 | Hirota | G06T 7/0012 |
| 2005/0163344 A1* | 7/2005 | Kayahara | G06K 9/00442 |
| | | | 382/103 |
| 2006/0193536 A1* | 8/2006 | Pilu | G06K 9/3233 |
| | | | 382/298 |
| 2006/0269098 A1* | 11/2006 | Ebitani | G06K 9/3216 |
| | | | 382/100 |
| 2009/0220155 A1* | 9/2009 | Yamamoto | G06K 9/00221 |
| | | | 382/190 |
| 2010/0142821 A1* | 6/2010 | Hosoi | G06K 9/468 |
| | | | 382/190 |
| 2010/0226564 A1* | 9/2010 | Marchesotti | G06F 17/30256 |
| | | | 382/159 |
| 2011/0019921 A1* | 1/2011 | Hamada | G06K 9/6211 |
| | | | 382/195 |
| 2012/0063639 A1* | 3/2012 | Yano | G06K 9/3233 |
| | | | 382/103 |
| 2012/0092495 A1* | 4/2012 | Yano | G06K 9/00771 |
| | | | 348/143 |
| 2012/0275701 A1* | 11/2012 | Park | G06K 9/4671 |
| | | | 382/173 |
| 2012/0288189 A1* | 11/2012 | Hu | G06K 9/4671 |
| | | | 382/164 |
| 2013/0027532 A1* | 1/2013 | Hirota | G06T 7/0012 |
| | | | 348/65 |
| 2013/0064455 A1* | 3/2013 | Yamanaka | G06K 9/46 |
| | | | 382/195 |
| 2013/0121590 A1* | 5/2013 | Yamanaka | G06K 9/6201 |
| | | | 382/195 |
| 2013/0223740 A1* | 8/2013 | Wang | G06K 9/4638 |
| | | | 382/171 |
| 2014/0056518 A1* | 2/2014 | Yano | G06K 9/6267 |
| | | | 382/173 |
| 2014/0334682 A1* | 11/2014 | Lee | G10L 17/02 |
| | | | 382/103 |
| 2014/0347513 A1* | 11/2014 | Kobayashi | H04N 5/23229 |
| | | | 348/222.1 |
| 2015/0055824 A1* | 2/2015 | Hong | G06K 9/00624 |
| | | | 382/103 |
| 2015/0071532 A1* | 3/2015 | Ruan | G06K 9/4604 |
| | | | 382/165 |
| 2015/0117784 A1* | 4/2015 | Lin | G06K 9/4671 |
| | | | 382/195 |
| 2015/0227817 A1* | 8/2015 | Lin | G06K 9/6212 |
| | | | 382/170 |
| 2015/0294181 A1* | 10/2015 | Yamanaka | G06K 9/4671 |
| | | | 382/203 |
| 2015/0324995 A1* | 11/2015 | Yamamoto | G06T 7/0081 |
| | | | 382/173 |
| 2017/0039417 A1* | 2/2017 | Saruta | G06K 9/00228 |

* cited by examiner

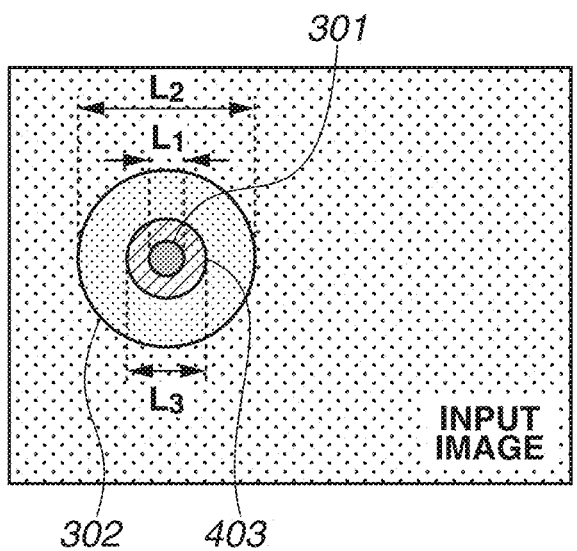
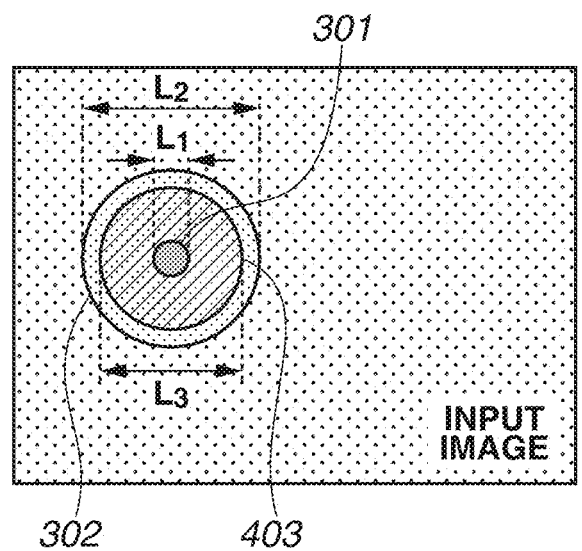

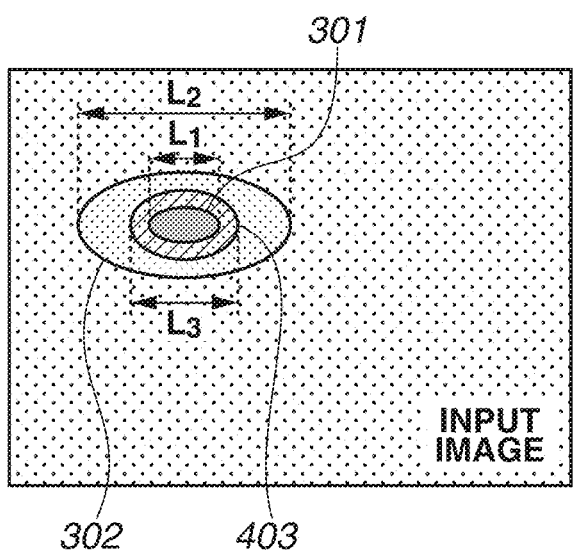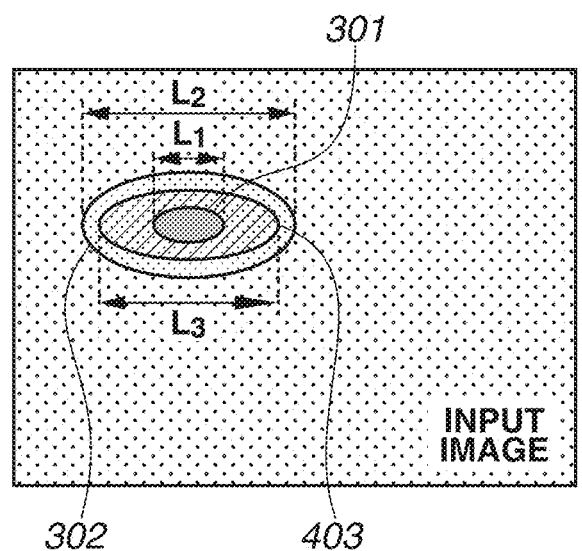

OBJECT DETECTION APPARATUS, OBJECT DETECTION METHOD, AND STORAGE MEDIUM

CROSS-REFERENCE TO RELATED APPLICATIONS

This application is a continuation, and claims the benefit, of U.S. patent application Ser. No. 14/683,025, presently pending and filed on Apr. 9, 2015, and claims the benefit of, and priority to, Japanese Patent Application No. 2014-083703 filed Apr. 15, 2014, which applications are hereby incorporated by reference herein in their entireties.

BACKGROUND OF THE INVENTION

Field of the Invention

The present invention relates, in particular, to an object detection apparatus for detecting a main object, an object detection method thereof, and a storage medium.

Description of the Related Art

As a conventional method for detecting a main object in an input image, there is a method discussed in Japanese Patent Application Laid-Open No. 2012-243313, for example. According to the method discussed in Japanese Patent Application Laid-Open No. 2012-243313, an input image is first divided into a plurality of partial regions by using an automatic partition algorithm. In addition, based on a weighted sum of differences in feature amount between a given partial region and the other partial regions among the obtained plurality of partial regions, a salience degree of the given partial region is calculated. Then, a main object in the image is detected based on the obtained salience degree.

In addition, A. Dominik et al., Center-surround Divergence of Feature Statistics for Salient Object Detection, ICCV 2011, for example, discusses another method for detecting a main object in an input image. According to the method discussed in A. Dominik et al., Center-surround Divergence of Feature Statistics for Salient Object Detection, ICCV 2011, a plurality of types of feature amounts is first extracted from an input image, and multiple-resolution images are generated with respect to the feature amounts. In addition, two partial regions of different sizes are set for each of the obtained multiple-resolution images, and a salience degree is calculated based on a difference in statistical distribution (Kullback-Leibler divergence) of extracted feature amount between the aforementioned two partial regions. Furthermore, a salience degree image is generated by integrating the salience degrees obtained for the respective multiple-resolution images, and lastly a main object in the image is detected based on the obtained salience degree image.

T. Kadir et al., An affine invariant salient region detector, ECCV 2004, for example, discusses yet another method for detecting a main object (or a partial region thereof) in an input image. According to the method discussed in T. Kadir et al., An affine invariant salient region detector, ECCV 2004, a plurality of types of feature amounts is first extracted from an input image, and multiple-resolution images are generated with respect to the feature amounts. Then, two partial regions of different sizes are set for each of the generated multiple-resolution images. Thereafter, a salience degree is calculated based on a product of a difference in statistical distribution of extracted feature amount between the aforementioned two partial regions (a distance between scaled probability distributions) and an information amount of the feature amount extracted from one of the aforementioned two partial regions (information entropy). Furthermore, a salience degree image is generated by integrating the salience degrees obtained for the respective multiple-resolution images, and lastly a main object (or a partial region thereof) in the image is detected based on the obtained salience degree image.

As described above, according to the methods discussed in Japanese Patent Application Laid-Open No. 2012-243313 and in A. Dominik et al., Center-surround Divergence of Feature Statistics for Salient Object Detection, ICCV 2011, the salience degree is calculated based on the difference in statistical feature amount distribution in the input image, and the main object in the image is detected based on the obtained salience degree. However, there arises a problem in that the accuracy in detecting the main object degrades if the main object in the image is not visually prominent.

In addition, according to the method discussed in T. Kadir et al., An affine invariant salient region detector, ECCV 2004, the size of the information amount (information entropy) contained in the main object in the input image is calculated, and the main object in the image is detected based on the obtained size of the information amount (information entropy). However, there arises a problem in that this method is susceptible to noise caused by an environmental or observational factor, and the accuracy in detecting the main object degrades in turn.

SUMMARY OF THE INVENTION

The present invention is directed to enabling a main object in an image to be detected more robustly.

According to an aspect of the present invention, an object detection apparatus includes a first setting unit configured to set a first partial region in an input image, a second setting unit configured to set a second partial region, which is different from the first partial region set by the first setting unit, in the input image, a third setting unit configured to set a third partial region, which belongs to the second partial region, based on an information amount in the second partial region set by the second setting unit, a salience degree deriving unit configured to derive a salience degree based on a feature amount in the first partial region and a feature amount in the second partial region, and a detection unit configured to detect a main object in the input image based on the salience degree derived by the salience degree deriving unit and an information amount in the third partial region set by the third setting unit.

Further features of the present invention will become apparent from the following description of exemplary embodiments with reference to the attached drawings.

BRIEF DESCRIPTION OF THE DRAWINGS

FIGS. 6A and 6B each illustrate a third partial region having a circular shape according to the first exemplary embodiment.

FIGS. 7A and 7B each illustrate a third partial region having an elliptical shape according to the first exemplary embodiment.

DESCRIPTION OF THE EMBODIMENTS

Hereinafter, a first exemplary embodiment of the present invention will be described with reference to FIG. 1 through FIGS. 9A to 9D.

Figure 1:
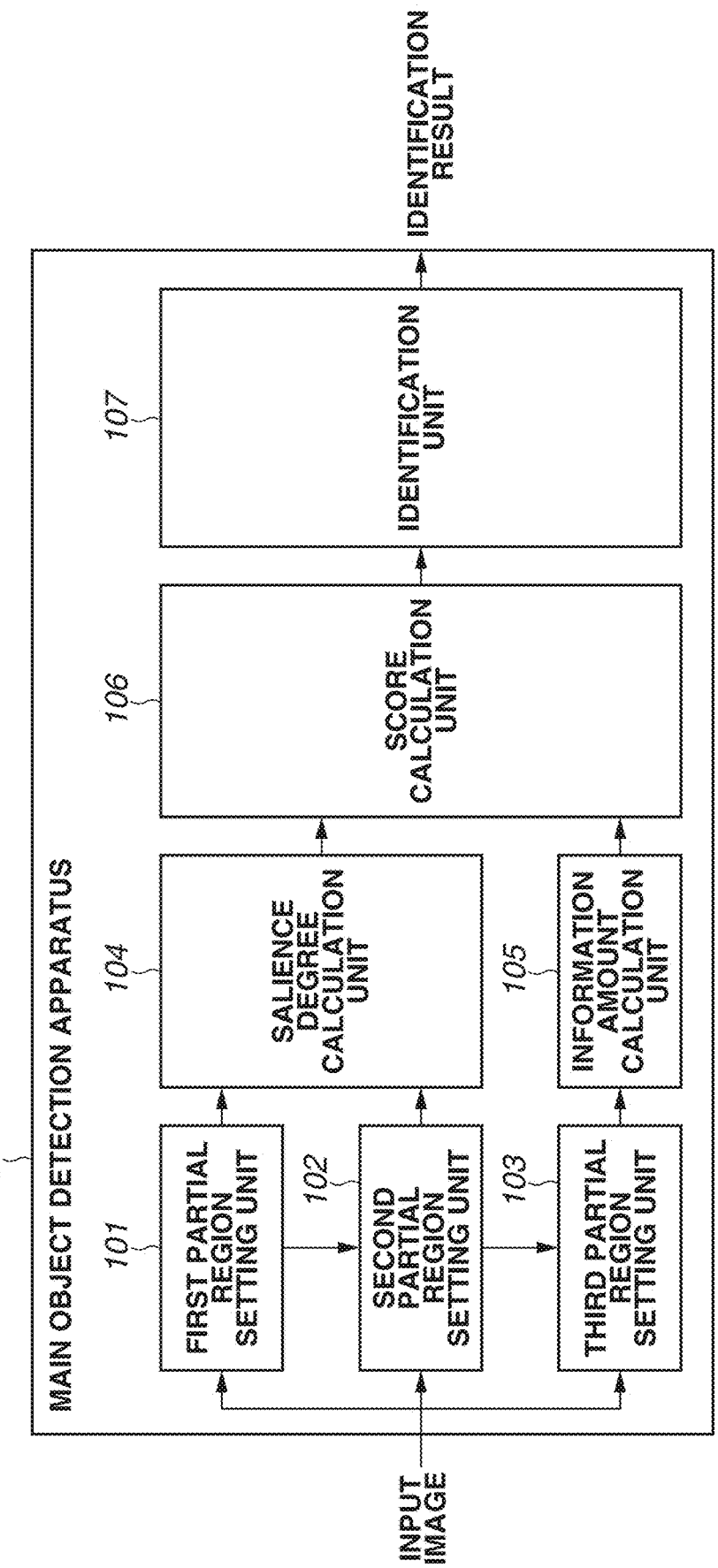
FIG. 1 is a block diagram illustrating an example of a functional configuration of a main object detection apparatus according to an exemplary embodiment.

FIG. 1 is a block diagram illustrating an example of a functional configuration of a main object detection apparatus 100 according to the present exemplary embodiment. The functionality of the main object detection apparatus 100 according to the present exemplary embodiment is implemented through a program executed by a semiconductor large-scale integrated circuit (LSI) (not illustrated) or a central processing unit (CPU) (not illustrated).

As illustrated in FIG. 1, the main object detection apparatus 100 includes a first partial region setting unit 101, a second partial region setting unit 102, a third partial region setting unit 103, a salience degree calculation unit 104, an information amount calculation unit 105, a score calculation unit 106, and an identification unit 107. These components correspond to the respective functions implemented by the main object detection apparatus 100.

Figure 2:
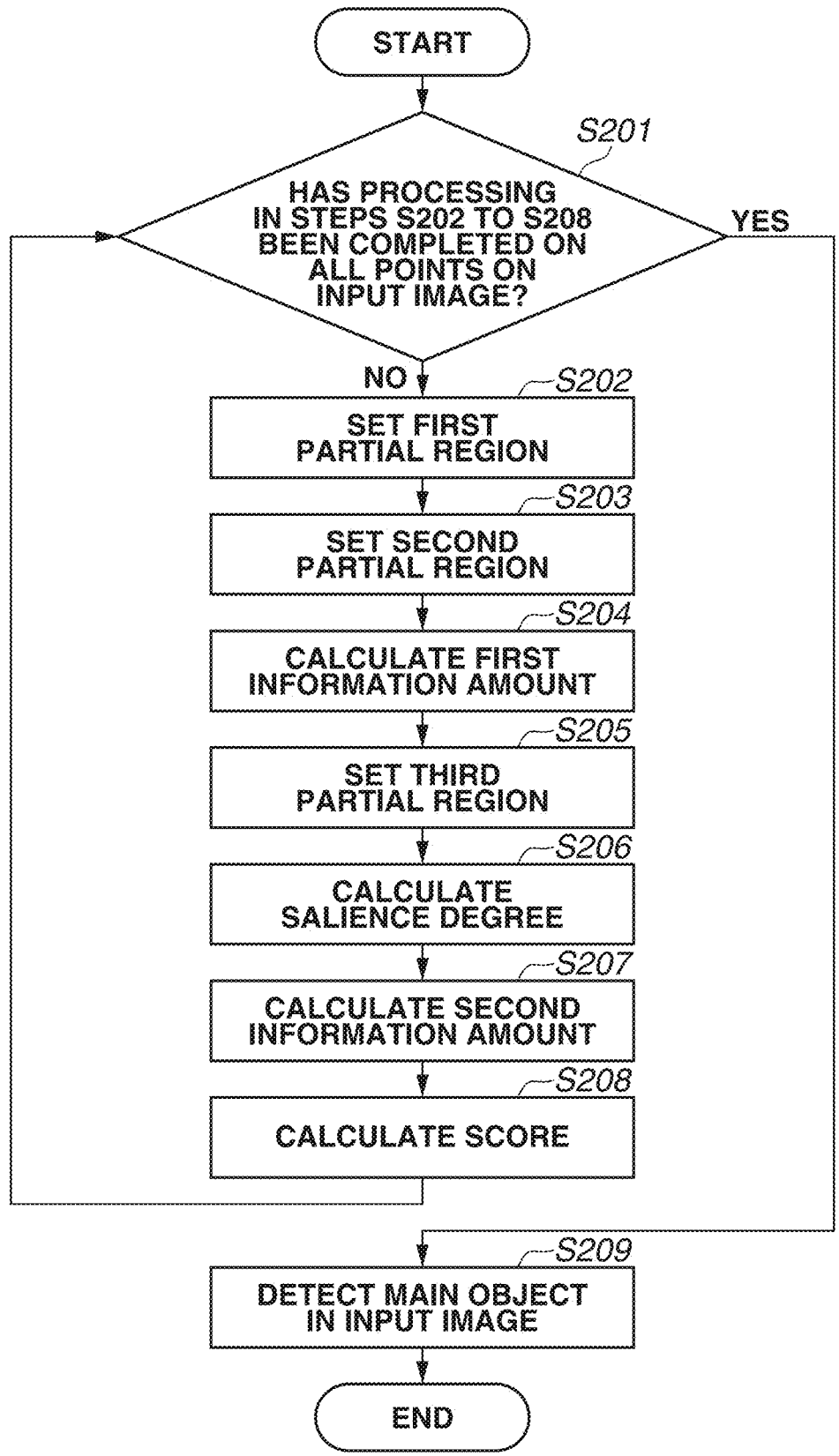
FIG. 2 is a flowchart illustrating an example of a processing procedure for identifying a main object.

FIG. 2 is a flowchart illustrating an example of a processing procedure for identifying a main object performed by the main object detection apparatus 100 according to the present exemplary embodiment. Hereinafter, processing performed by the main object detection apparatus 100 according to the present exemplary embodiment will be described with reference to FIGS. 1 and 2.

As illustrated in FIG. 2, the main object detection apparatus 100 first sets, in a given point (pixel) on an input image, a first partial region having a preset size and a second partial region different from the first partial region. Then, the main object detection apparatus 100 calculates a first information amount in the second partial region, and sets a third partial region based on the size of the first information amount. Furthermore, the main object detection apparatus 100 calculates a score based on a salience degree that is based on a difference in statistical feature amount distribution between the first partial region and the second partial region, and based on an information amount of feature amount in the third partial region. Lastly, the main object detection apparatus 100 detects a main object by calculating scores of respective points in the image and applying a predetermined statistical process to the scores. Hereinafter, this processing will be described in detail.

Upon an image being input to the main object detection apparatus 100, the processing starts. In step S201, it is determined whether processes in steps S202 through S208 have been completed on all points in the input image. If the determination result indicates that the processes have been completed on all points in the input image (YES in step S201), the processing proceeds to step S209. If the determination result indicates that the processes have not been completed on all points in the input image (NO in step S201), the processing proceeds to step S202.

Figure 3A:
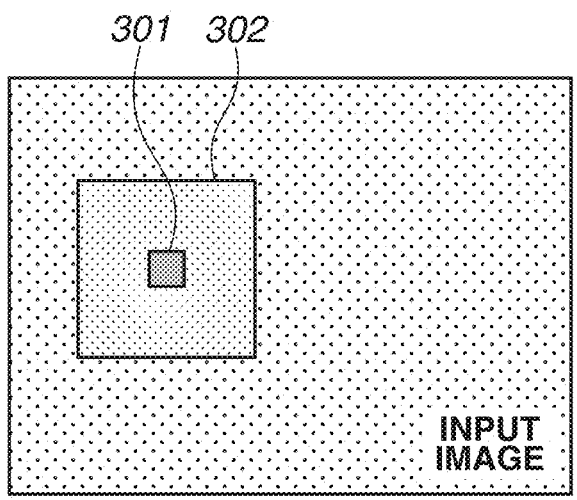
FIGS. 3A, 3B, 3C, and 3D each illustrate a relationship between a first partial region and a second partial region according to first and second exemplary embodiments.
Figure 3B:
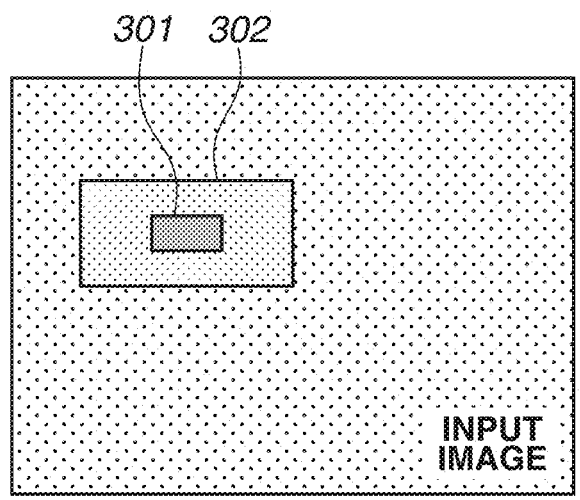
Figure 3C:
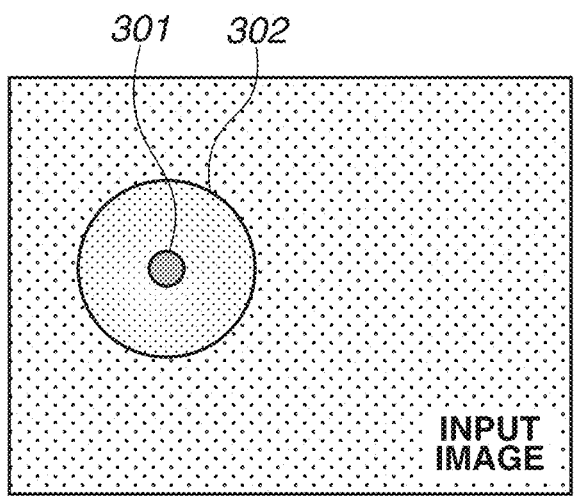
Figure 3D:
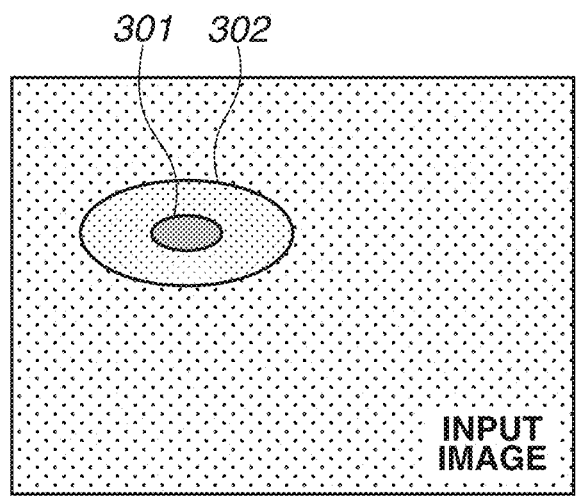

In step S202, the first partial region setting unit 101 sets a first partial region 301 in an image space of the input image, which has been input from the outside of the main object detection apparatus 100, as illustrated in FIGS. 3A through 3D. More specifically, the first partial region setting unit 101 may set a square region as the first partial region 301 as illustrated in FIG. 3A, or may set a rectangular region as the first partial region 301 as illustrated in FIG. 3B. Alternatively, the first partial region setting unit 101 may set a circular region as the first partial region 301 as illustrated in FIG. 3C, or may set an elliptical region as the first partial region 301 as illustrated in FIG. 3D.

In step S203, the second partial region setting unit 102 sets a second partial region 302, which is different from the first partial region 301, in the image space of the input image, as illustrated in FIGS. 3A through 3D. More specifically, the second partial region setting unit 102 may set a square region that contains the first partial region 301 as the second partial region 302 as illustrated in FIG. 3A, or may set a rectangular region that contains the rectangular first partial region 301 as the second partial region 302 as illustrated in FIG. 3B. Alternatively, the second partial region setting unit 102 may set a circular region that contains the circular first partial region 301 as the second partial region 302 as illustrated in FIG. 3C, or may set an elliptical region that contains the elliptical first partial region 301 as the second partial region 302 as illustrated in FIG. 3D.

In step S204, the second partial region setting unit 102 calculates an information amount (hereinafter referred to as first information amount) of the feature amount (e.g., luminance value, color component, edge intensity) in the second partial region 302. The size of the first information amount is calculated as entropy H through the following expression (1), for example.

$$H = -\sum_i P_i \log_2 P_i \qquad (1)$$

In the expression (1), $P_i$ represents an occurrence probability of the ith gradation in the feature amount in the second partial region 302. When the number of gradations in a given feature amount is 256 (=$2^8$), the maximum value of the entropy H is 8, and the minimum value thereof is 0.

Figure 4A:
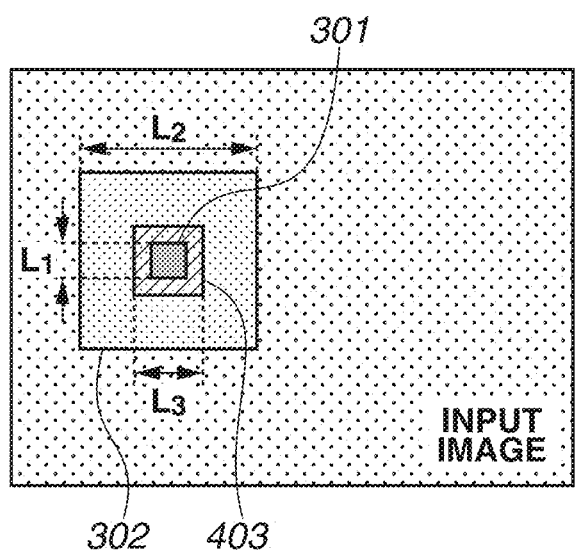
FIGS. 4A and 4B each illustrate a third partial region having a square shape according to the first exemplary embodiment.

In step S205, the third partial region setting unit 103 sets a third partial region based on the size of the first information amount in the second partial region 302 of the input image. More specifically, when the first information amount is large, for example, the third partial region setting unit 103 sets, as a third partial region 403, a relatively small square region that contains the first partial region 301 and that is contained by the second partial region 302, as illustrated in FIG. 4A. Meanwhile, when the first information amount is small, the third partial region setting unit 103 may set, as the third partial region 403, a relatively large square region that contains the first partial region 301 and that is contained by the second partial region 302, as illustrated in FIG. 4B.

When the first partial region 301 and the second partial region 302 are each set to a square region, a length $L_3$ of a side of the third partial region 403 is calculated through the following expression (2) by using a length $L_1$ of a side of the first partial region 301 and a length $L_2$ of a side of the second partial region 302, for example.

$$L_3 = L_1 + \frac{H}{8}(L_2 - L_1) \qquad (2)$$

Figure 4B:
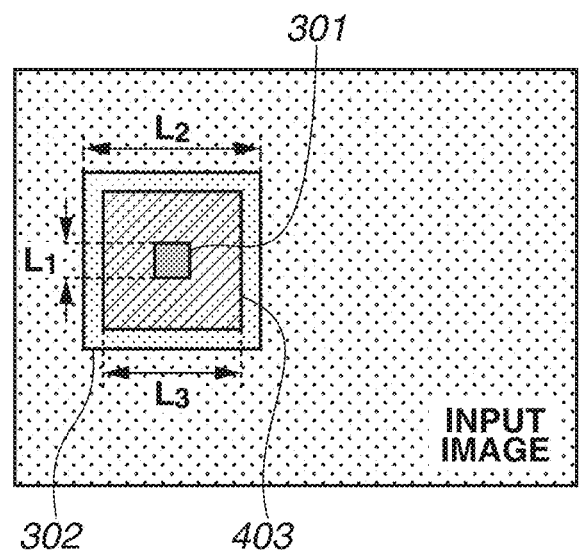

According to the expression (2), the length $L_3$ of the side of the third partial region 403 illustrated in FIGS. 4A and 4B is given by a real number in a range from the minimum value $L_1$ to the maximum value $L_2$ according to the magnitude of the entropy H.

Figure 5A:
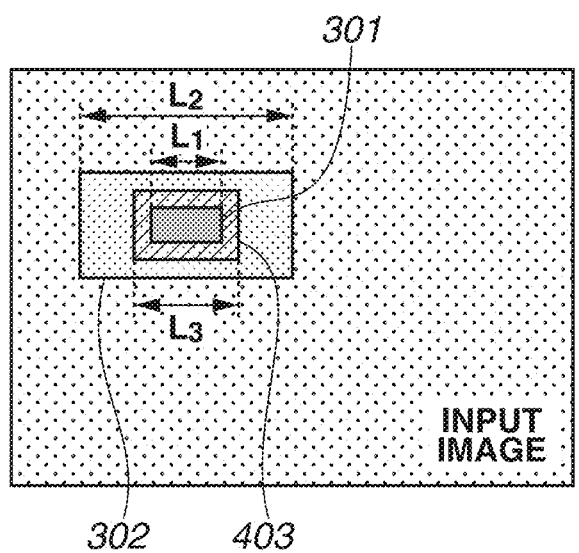
FIGS. 5A and 5B each illustrate a third partial region having a rectangular shape according to the first exemplary embodiment.
Figure 5B:
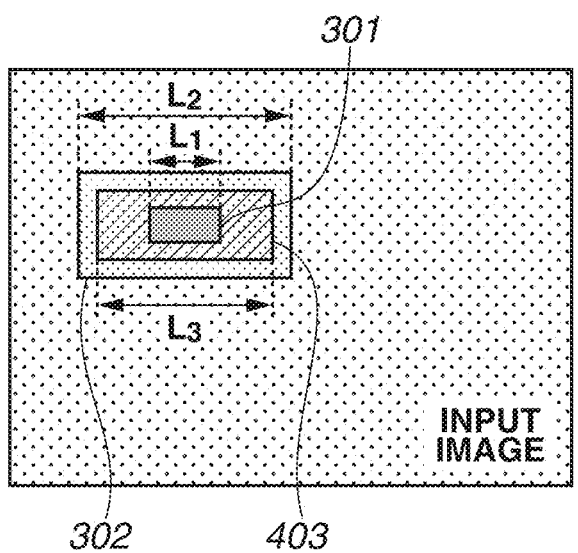

When the first partial region 301 and the second partial region 302 are set as illustrated in FIG. 3B, the third partial region 403 is set as follows. When the first information amount is large, the third partial region setting unit 103 sets, as the third partial region 403, a relatively small rectangular region that contains the first partial region 301 and that is contained by the second partial region 302, as illustrated in FIG. 5A. Meanwhile, when the first information amount is small, the third partial region setting unit 103 sets, as the third partial region 403, a relatively large rectangular region that contains the first partial region 301 and that is contained by the second partial region 302, as illustrated in FIG. 5B. The length $L_3$ of a long side of the third partial region 403 illustrated in FIGS. 5A and 5B can be calculated through the expression (2) by using the length $L_1$ of a long side of the first partial region 301 and the length $L_2$ of a long side of the second partial region 302, and the length of a short side of the third partial region 403 can also be calculated in a similar manner.

When the first partial region 301 and the second partial region 302 are set as illustrated in FIG. 3C, the third partial region 403 is set as follows. When the first information amount is large, the third partial region setting unit 103 sets, as the third partial region 403, a relatively small circular region that contains the first partial region 301 and that is contained by the second partial region 302, as illustrated in FIG. 6A. Meanwhile, when the first information amount is small, the third partial region setting unit 103 sets, as the third partial region 403, a relatively large circular region that contains the first partial region 301 and that is contained by the second partial region 302, as illustrated in FIG. 6B. The length $L_3$ of the diameter of the third partial region 403 illustrated in FIGS. 6A and 6B can be calculated through the expression (2) by using the length $L_1$ of the diameter of the first partial region 301 and the length $L_2$ of the diameter of the second partial region 302.

In addition, when the first partial region 301 and the second partial region 302 are set as illustrated in FIG. 3D, the third partial region 403 is set as follows. When the first information amount is large, the third partial region setting unit 103 sets, as the third partial region 403, a relatively small elliptical region that contains the first partial region 301 and that is contained by the second partial region 302, as illustrated in FIG. 7A. Meanwhile, when the first information amount is small, the third partial region setting unit 103 sets, as the third partial region 403, a relatively large elliptical region that contains the first partial region 301 and that is contained by the second partial region 302, as illustrated in FIG. 7B. The length $L_3$ of the major axis of the third partial region 403 illustrated in FIGS. 7A and 7B can be calculated through the expression (2) by using the length $L_1$ of the major axis of the first partial region 301 and the length $L_2$ of the major axis of the second partial region 302, and the length of the minor axis of the third partial region 403 can also be calculated in a similar manner.

Figure 8:
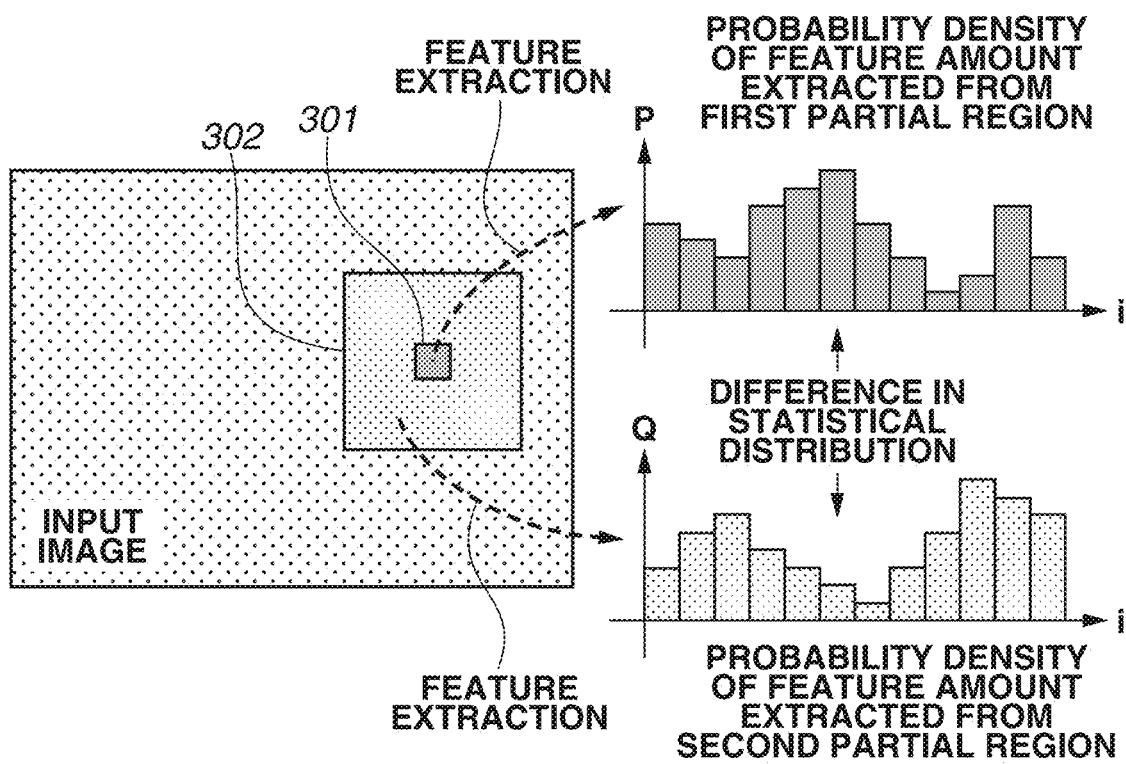
FIG. 8 illustrates a procedure for calculating a salience degree based on a difference in statistical feature amount distribution between partial regions.

In step S206, the salience degree calculation unit 104, serving as a salience degree deriving unit, calculates a salience degree based on the first partial region 301 set by the first partial region setting unit 101 and the second partial region 302 set by the second partial region setting unit 102. More specifically, as illustrated in FIG. 8, the salience degree calculation unit 104 calculates a visual salience degree based on a difference in statistical feature amount distribution between the first and second partial regions 301 and 302. Here, the salience degree is calculated, for example, through the following expression (3) by using a histogram intersection HI.

$$HI = \sum_i \min(P(i), Q(i)) \qquad (3)$$

Alternatively, the salience degree may be calculated through the expression (4) by using the Pearson divergence $D_{PR}$.

$$D_{PR} = \frac{1}{2}\sum_i \left(1 - \frac{P(i)}{Q(i)}\right)^2 Q(i) \qquad (4)$$

As another alternative, the salience degree may be calculated through the following expression (5) by using the relative Pearson divergence $D_{RP}$. Here, $\beta$ is an arbitrary real number between 0 and 1 inclusive.

$$\begin{cases} D_{RP} = \frac{1}{2}\sum_i (1 - w(i))^2(\beta P(i) - (1-\beta)Q(i)) \\ w(i) = \frac{P(i)}{\beta P(i) + (1-\beta)Q(i)} \end{cases} \qquad (5)$$

As yet another alternative, the salience degree may be calculated through the following expression (6) by using the Kullback-Leibler divergence $D_{KL}$.

$$D_{KL} = \sum_i P(i)\log\frac{P(i)}{Q(i)} \qquad (6)$$

As yet another alternative, the salience degree may be calculated through the following expression (7) by using the Bhattacharyya distance $D_{BT}$.

$$D_{BT} = -\log\sum_i \sqrt{P(i)Q(i)} \qquad (7)$$

As yet another alternative, the salience degree may be calculated through the following expression (8) by using the distance scale D.

$$D = \sum_i \sum_j P(i)Q(j)|i-j| \qquad (8)$$

As yet another alternative, the salience degree may be calculated through the following expression (9) by using $D_{abs}$.

$$D_{abs} = \sum_i |P(i) - Q(i)| \qquad (9)$$

Here, in the expressions (3) through (9), P(i) represents a probability of the ith gradation in probability density P of the feature amount extracted from the first partial region 301, and Q(i) represents a probability of the ith gradation in probability density Q of the feature amount extracted from the second partial region 302.

In step S207, the information amount calculation unit 105 calculates an information amount (hereinafter referred to as second information amount) of the feature amount (e.g., luminance value, color component, edge intensity) in the third partial region 403 set by the third partial region setting unit 103. More specifically, the second information amount may be given, for example, by a total of gradient intensities of the feature amount in the third partial region 403 that are calculated at the respective points in the third partial region 403. Here, the gradient intensity may be calculated by using a known image processing filter (e.g., Sobel filter, Canny filter, Laplacian filter, Gabor filter).

In step S208, the score calculation unit 106 calculates a score (scale indicating whether the main object is present) at the point to be processed in the input image, based on the salience degree obtained by the salience degree calculation unit 104 and the second information amount obtained by the information amount calculation unit 105. Here, the score at each point in the input image may be given, for example, by a product of the salience degree obtained by the salience degree calculation unit 104 and the second information amount obtained by the information amount calculation unit 105. Alternatively, the score may be given by a sum of the salience degree obtained by the salience degree calculation unit 104 and the second information amount obtained by the information amount calculation unit 105. As another alternative, the score may be given by a combination of a product and a sum of the salience degree obtained by the salience degree calculation unit 104 and the second information amount obtained by the information amount calculation unit 105.

Figure 9A:
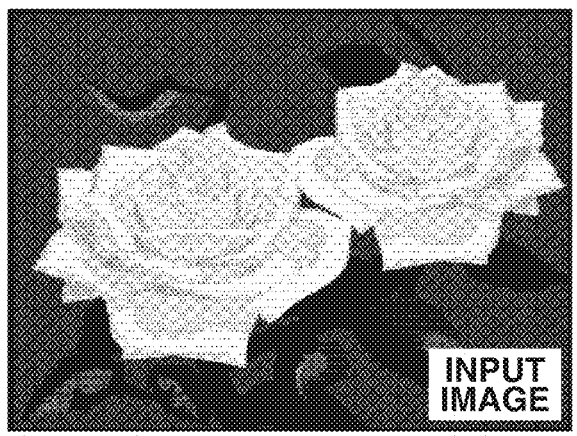
FIGS. 9A, 9B, 9C, and 9D each illustrate a procedure for detecting a main object based on a score map.
Figure 9B:
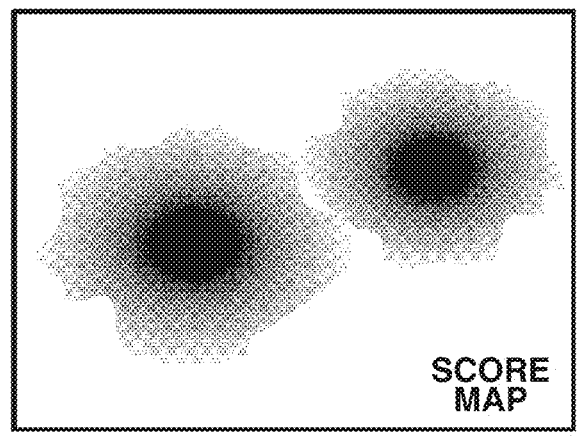
Figure 9C:
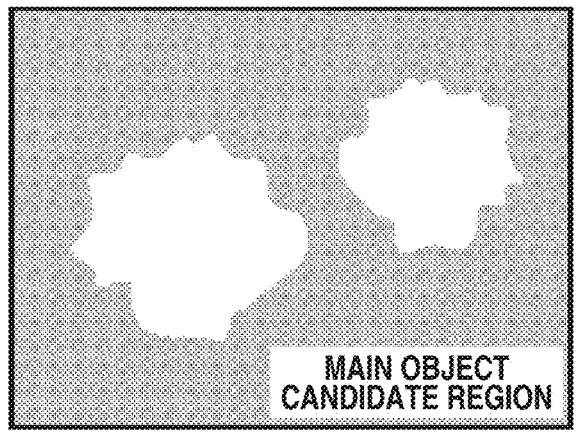
Figure 9D:
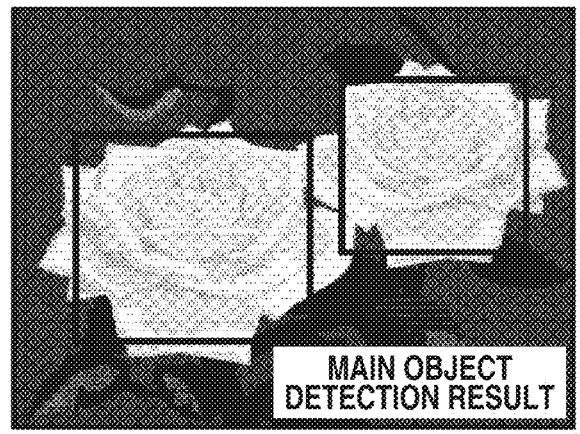

In step S209, the identification unit 107 detects the main object in the input image based on the scores calculated by the score calculation unit 106. More specifically, for example, the identification unit 107 first generates a score map (see FIG. 9B) in which the scores at the respective points in the input image, which have been calculated for the input image as illustrated in FIG. 9A, are arranged on the input image. Then, the obtained score map is subjected to binarization processing described in N. Otsu, An Automatic Threshold Selection Method Based on Discriminant and Least Squares Criteria (Japanese), Transactions of the Institute of Electronics and Communication Engineers of Japan, vol. J63-D, No. 4, (1980), pp. 349-356, or more specifically, a technique for setting a threshold value through adaptive learning by minimizing the intra-class distribution and by maximizing the inter-class distribution is applied to the obtained score map and a candidate region for the main object is set as illustrated in FIG. 9C. In addition, by setting a rectangular region that circumscribes the obtained candidate region for the main object, the main object in the input image is detected as illustrated in FIG. 9D, and the result of the detection is output.

The result of detecting the main object obtained as described above is used by an apparatus that utilizes the main object detection apparatus 100. For example, in a case where the region detected as the main object is brought into focus and a high-quality image of the region is to be captured by a digital still camera, the aforementioned result is transmitted to a CPU, a program, and so on within the digital still camera that controls the main object detection apparatus 100.

According to the present exemplary embodiment described above, the main object is detected by calculating the scores according to the visual salience degree and the information amount of the feature amount (e.g., luminance value, color component, edge intensity) in the third partial region. This allows, even when a main object in an image is not visually prominent or noise caused by an environmental or observational factor is present, the main object to be detected robustly.

Hereinafter, a second exemplary embodiment of the present invention will be described with reference to FIG. 10 and FIGS. 11A through 11D. In the present exemplary embodiment, the configuration and the basic processing flow of the main object detection apparatus are similar to those of the first exemplary embodiment, and only the differences from the first exemplary embodiment will be described. In the first exemplary embodiment, the third partial region is set so that the centroid of the third partial region coincides with the centroids of the first partial region and the second partial region. Unlike the first exemplary embodiment, in the present exemplary embodiment, a plurality of partial regions of different sizes that are contained by a second partial region is set as a third partial region, irrespective of its relationship to the centroids of the first partial region and the second partial region.

In step S204 of FIG. 2, the second partial region setting unit 102 calculates the information amount (first information amount) of the feature amount (e.g., luminance value, color component, edge intensity) in the second partial region 302. Here, the first information amount is calculated, for example, by using the difference of Gaussian (DoG), which is a type of a bandpass filter, described in Lowe, D. G., Object recognition from local scale invariant features, Proc. of IEEE International Conference on Computer Vision, pp. 1150-1157 (1999). More specifically, a smoothed image L (x, y, kσ) obtained by applying a Gaussian function G (x, y, kσ) to an input image I (x,y) and another smoothed image L (x, y, σ) obtained by applying a Gaussian function G (x, y, σ) to the input image I (x, y) are calculated through the following expression (10). Then, a difference image D (x, y, σ) of these smoothed images L is calculated. Here, (x, y) represents the coordinates on the input image I in the horizontal and vertical directions. In addition, k represents a rate of increase in a Gaussian parameter σ, which is uniquely determined according to a calculation time permitted for the main object detection apparatus 100 in an assumed application.

$$\begin{cases} L(x, y, \sigma) = G(x, y, \sigma) \cdot I(x, yt) \\ G(x, y, \sigma) = \dfrac{1}{2\pi\sigma^2} \exp\left(-\dfrac{x^2 + y^2}{2\sigma^2}\right) \\ D(x, y, \sigma) = L(x, y, k\sigma) - L(x, y, \sigma) \end{cases} \quad (10)$$

Figure 10:
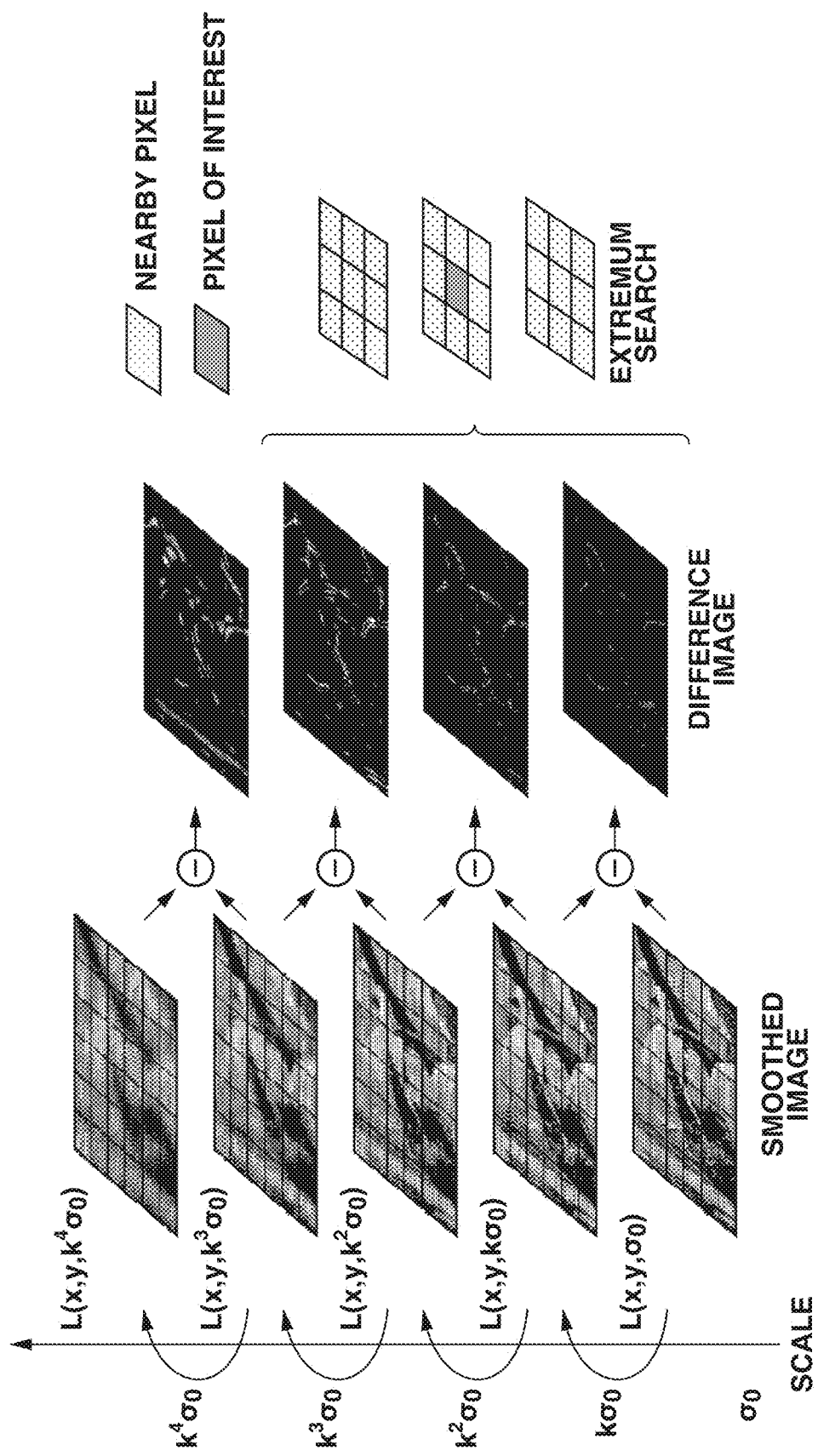
FIG. 10 illustrates a procedure for obtaining a third partial region according to the second exemplary embodiment.
Figure 11A:
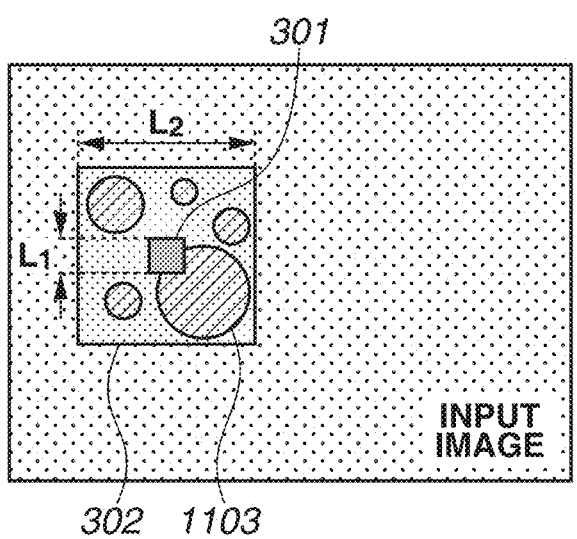
FIGS. 11A, 11B, 11C, and 11D each illustrate the third partial region according to the second exemplary embodiment.
Figure 11B:
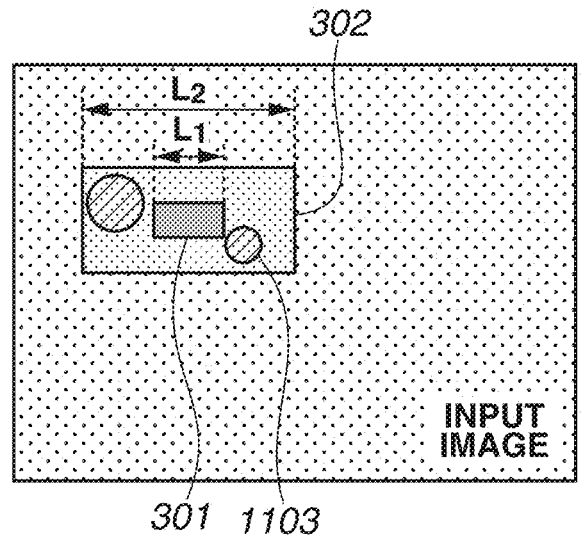
Figure 11C:
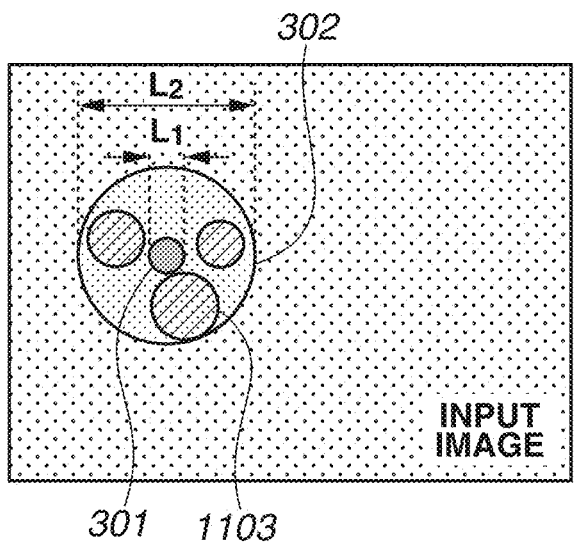
Figure 11D:
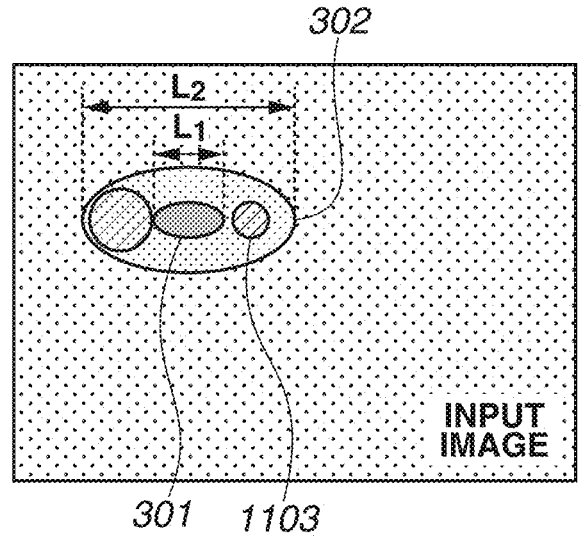

The position and the size of the third partial region to be set in step S205 of FIG. 2 are, for example, given as follows. As illustrated in FIG. 10, a pixel of interest and neighborhood pixels in the difference image D (x, y, σ) are compared. Then, a circular region having a diameter represented by the Gaussian parameter σ (or a value obtained by multiplying the Gaussian parameter σ by a predetermined coefficient) is obtained based on the extrema (maximum value and minimum value) that are obtained through the comparison or based on the coordinates (x, y) where a pixel value is equal to or greater than a threshold value in the difference image D (x, y, σ). As a result, the third partial region is given by a plurality of circular regions at different positions and of different sizes within the second partial region 302, as illustrated in FIGS. 11A through 11D.

Alternatively, the position and the size of the third partial region may be calculated by using the Laplacian of Gaussian (LoG), which is a type of a bandpass filter, described in T. Lindeberg (1994), Scale-Space Theory in Computer Vision, Springer, ISBN 0-7923-9418-6. In this case, a circular region having a diameter represented by the Gaussian parameter σ (or a value obtained by multiplying the Gaussian parameter σ by a predetermined coefficient) is obtained based on the extrema (maximum value and minimum value) that are obtained by comparing a pixel of interest and neighborhood pixels in an LoG image or based on the coordinates (x, y) where a pixel value is equal to or greater than a threshold value in the LoG image.

As another alternative, the position and the size of the third partial region may be calculated by using a Gabor filter, which is a type of a bandpass filter and is a known image processing filter. In this case, a circular region having a diameter represented by the Gaussian parameter σ (or a value obtained by multiplying the Gaussian parameter σ by a predetermined coefficient) is obtained based on the coordinates (x, y) of the extrema (maximum value and minimum value) that are obtained by comparing a pixel of interest and neighborhood pixels in terms of their filter output values.

After the third partial region is set as described above, the main object can be detected through procedures similar to those in the first exemplary embodiment.

Hereinafter, a third exemplary embodiment of the present invention will be described with reference to FIGS. 12A through 12D. In the present exemplary embodiment, the configuration and the basic processing flow of the main object detection apparatus are similar to those of the first exemplary embodiment, and only the differences from the first exemplary embodiment will be described. While the first partial region and the second partial region are in an inclusion relation in the first exemplary embodiment, the first partial region and the second partial region are not necessarily in an inclusion relation in the present exemplary embodiment.

Figure 12A:
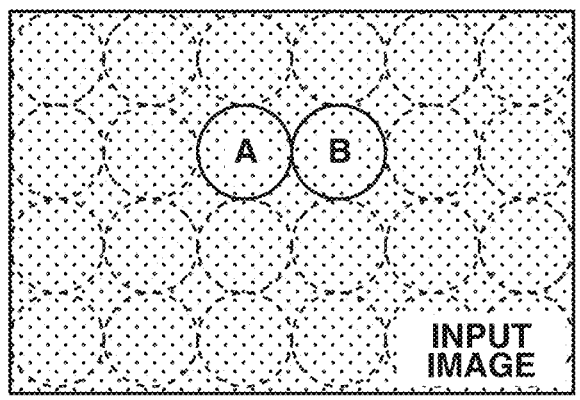
FIGS. 12A, 12B, 12C, and 12D each illustrate a relationship between a first partial region and a second partial region according to a third exemplary embodiment.

In step S202 of FIG. 2, the first partial region setting unit 101 sets the first partial region in the input image, which has been input from the outside of the main object detection apparatus 100. More specifically, as illustrated in FIG. 12A, circular regions (or elliptical regions) of a given size are arranged at equal intervals in an image space, and the first partial region setting unit 101 sets one of the circular regions (e.g., circular region A in FIG. 12A) as the first partial region.

Figure 12B:
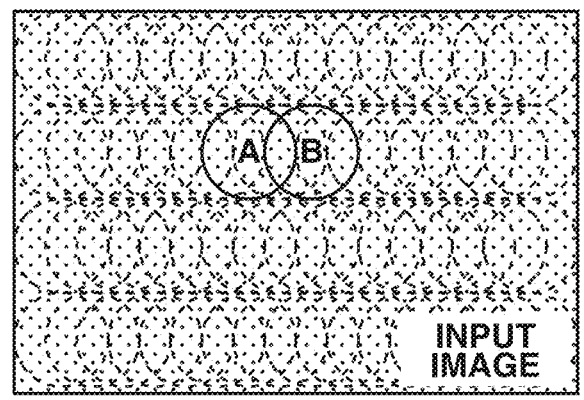
Figure 12C:
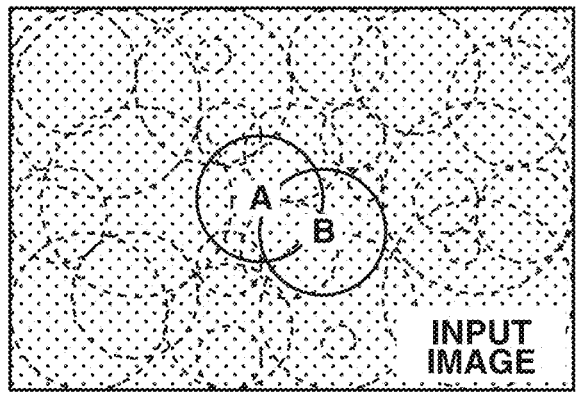

Alternatively, as illustrated in FIG. 12B, partially overlapping circular regions (or elliptical regions) of a given size may be arranged at equal intervals in the input image, and the first partial region setting unit 101 may set one of the circular regions (e.g., circular region A in FIG. 12B) as the first partial region. As another alternative, as illustrated in FIG. 12C, circular regions (or elliptical regions) of given sizes may be arranged at random in the input image, and the first partial region setting unit 101 may set one of the circular regions (e.g., circular region A in FIG. 12C) as the first partial region.

Figure 12D:
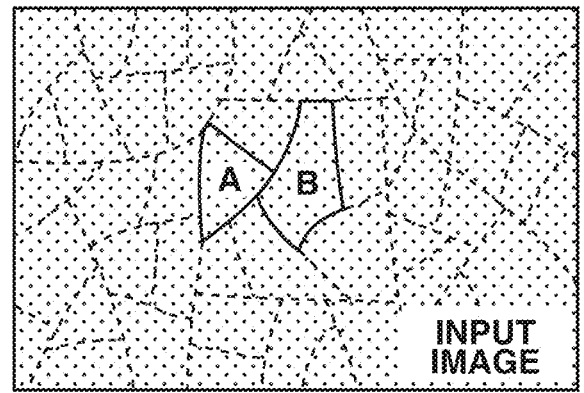

As yet another alternative, as illustrated in FIG. 12D, the input image may be divided into a plurality of local regions, and the first partial region setting unit 101 may set one of the plurality of local regions (e.g., local region A in FIG. 12D) as the first partial region. In this case, the input image is divided into a plurality of local regions based on the statistical distribution of the feature amount, such as the luminance value, the color component, the edge intensity, and the texture, in the input image. Here, the statistical distribution corresponds to, for example, whether a histogram of the feature amount within a region is unimodal or multimodal or whether the information amount of the feature amount within a region is equal to or greater than a threshold value. Alternatively, the input image may be divided into a plurality of local regions by using a method described in E. Sharon, A. Brandt, and R. Basri, Fast multiscale image segmentation Proc. IEEE Computer Vision and Pattern Recognition, pp. 70-77, 2000.

In step S203 of FIG. 2, the second partial region setting unit 102 sets the second partial region in the input image. More specifically, as illustrated in FIGS. 12A through 12D, the second partial region setting unit 102 sets, as the second partial region, any one (e.g., local region B in FIGS. 12A through 12D) of the partial regions adjacent to the first partial region (local region A in FIGS. 12A through 12D) set by the first partial region setting unit 101.

In step S204 of FIG. 2, the first partial region setting unit 101 calculates the information amount of the feature amount (e.g., luminance value, color component, edge intensity) in the first partial region in the input image. Then, the second partial region setting unit 102 calculates the information amount of the feature amount (e.g., luminance value, color component, edge intensity) in the second partial region in the input image in a similar manner.

In step S205 of FIG. 2, the third partial region setting unit 103 sets the third partial region based on the size of the information amount of the feature amount in the first partial region and the size of the information amount of the feature amount in the second partial region. More specifically, for example, the third partial region setting unit 103 compares the size of the information amount in the first partial region with the size of the information amount in the second partial region, and sets the first partial region as the third partial region if the size of the information amount in the first partial region is larger. Meanwhile, the third partial region setting unit 103 sets the second partial region as the third partial region if the size of the information amount in the second partial region is larger.

Here, the sizes of the information amounts in the first partial region and the second partial region may be given, for example, by the entropy H indicated in the expression (1) above. Alternatively, the size of the information amount in each of the first partial region and the second partial region may be given by a total of gradient intensities of the feature amount in the first or second partial region calculated at each point in the first or second partial region. Here, the gradient intensity may be calculated, for example, by using a known image processing filter (e.g., Sobel filter, Canny filter, Laplacian filter, Gabor filter).

In step S209, the identification unit 107 detects the main object in the input image based on the scores calculated by the score calculation unit 106. More specifically, the score calculation unit 106 first calculates scores on all the combinations of the first partial region set by the first partial region setting unit 101 and the second partial region set by the second partial region setting unit 102 in the input image.

While the processes in steps S201 through S208 are repeated on all the points in the input image in the first and second exemplary embodiments, the processes in steps S201 through S208 are repeated on all the combinations of the first partial region and the second partial region in the present exemplary embodiment. The scores are calculated by using the salience degree and the second information amount, as in the first exemplary embodiment.

Then, the identification unit 107 generates a score map in which the scores on all the combinations are arranged in an image space. The obtained score map is subjected to the aforementioned binarization processing described in N. Otsu, An Automatic Threshold Selection Method Based on Discriminant and Least Squares Criteria (Japanese), Transactions of the Institute of Electronics and Communication Engineers of Japan, vol. J63-D, No. 4, (1980), pp. 349-356, and thus a candidate region for the main object is set. In addition, by setting a rectangular region that circumscribes the obtained candidate region for the main object, the main object in the input image is detected.

According to the present exemplary embodiment described above, even when a main object in an image is not visually prominent or noise caused by an environmental or observational factor is present, the main object can be detected robustly.

An exemplary embodiment of the present invention can also be implemented by executing the following process. More specifically, software (program) for implementing the functions of the above-described exemplary embodiments is supplied to a system or to an apparatus through a network or various types of storage media, and a computer (or a CPU, a microprocessor unit (MPU), or the like) in the system or in the apparatus then loads and executes the program.

According to the exemplary embodiments of the present invention, even when a main object in an image is not visually prominent or noise caused by an environmental or observational factor is present, the main object can be detected more robustly.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An object detection apparatus, comprising:
a circuit which serves as:
a setting unit configured to set a first partial region, a second partial region, and a third partial region in an input image, the first partial region being smaller than an entirety of the input image, the second partial region including a surrounding region around the first partial region and being smaller than the entirety of the input image, and the third partial region including the first partial region and being smaller than the entirety of the input image;
a salience degree calculating unit configured to extract a feature amount relating to a luminance value or a color component from each of the first partial region and the second partial region, and configured to calculate a salience degree on a basis of a difference between the feature amount of the first partial region and the feature amount of the second partial region;
an extraction unit configured to extract edge intensity from the third partial region; and
a detection unit configured to detect a main object in the input image on a basis of the calculated salience degree and the edge intensity of the third partial region.

2. The object detection apparatus according to claim 1, wherein centroids of the first partial region, the second partial region, and the third partial region coincide with one another.

3. The object detection apparatus according to claim 1, wherein the third partial region is identical to the second partial region.

4. The object detection apparatus according to claim 1, wherein the second partial region is a region that is located outside the first partial region.

5. The object detection apparatus according to claim 1, wherein the third partial region is a region that is located inside the second partial region and includes the first partial region.

6. The object detection apparatus according to claim 1, wherein the feature amount relating to the luminance value of the first partial region is statistical distribution of the luminance value.

7. The object detection apparatus according to claim 1, wherein the circuit further serves as:
a score deriving unit configured to derive a score on a basis of the derived salience degree and the edge intensity of the third partial region;
wherein the detection unit detects the main object in the input image on a basis of the derived score.

8. The object detection apparatus according to claim 7, wherein the detection unit generates a score map in which scores derived on a plurality of points in the input image by the score deriving unit are arranged, and detects the main object in the input image on a basis of a threshold value for the score map.

9. An object detection method, comprising:
setting a first partial region, a second partial region, and a third partial region in an input image, the first partial region being smaller than an entirety of the input image, the second partial region including a surrounding region around the first partial region and being smaller than the entirety of the input image, and the third partial region including the first partial region and being smaller than the entirety of the input image;
extracting a feature amount relating to a luminance value or a color component from each of the first partial region and the second partial region, and calculating a salience degree on a basis of a difference between the feature amount of the first partial region and the feature amount of the second partial region;
extracting edge intensity from the third partial region; and
detecting a main object in the input image on a basis of the calculated salience degree and the edge intensity of the third partial region.

10. A non-transitory computer-readable storage medium storing a program that causes a computer to execute a method for detecting an object, the method comprising:
setting a first partial region, a second partial region, and a third partial region in an input image, the first partial region being smaller than an entirety of the input image, the second partial region including a surrounding region around the first partial region and being smaller than the entirety of the input image, and the third partial region including the first partial region and being smaller than the entirety of the input image;
extracting a feature amount relating to a luminance value or a color component from each of the first partial region and the second partial region, and calculating a salience degree on a basis of a difference between the feature amount of the first partial region and the feature amount of the second partial region;
extracting edge intensity from the third partial region; and
detecting a main object in the input image on a basis of the calculated salience degree and the edge intensity of the third partial region.

11. An object detection apparatus, comprising:
a memory; and
a processor in communication with the memory, the processor configured to provide:
a setting unit configured to set a first partial region, a second partial region, and a third partial region in an input image, the first partial region being smaller than an entirety of the input image, the second partial region including a surrounding region around the first partial region and being smaller than the entirety of the input image, and the third partial region including the first partial region and being smaller than the entirety of the input image;
a salience degree calculating unit configured to extract a feature amount relating to a luminance value or a color component from each of the first partial region and the second partial region, and configured to calculate a salience degree on a basis of a difference between the feature amount of the first partial region and the feature amount of the second partial region;
an extraction unit configured to extract edge intensity from the third partial region; and
a detection unit configured to detect a main object in the input image on a basis of the calculated salience degree and the edge intensity of the third partial region.

* * * * *